Patented Dec. 26, 1922.

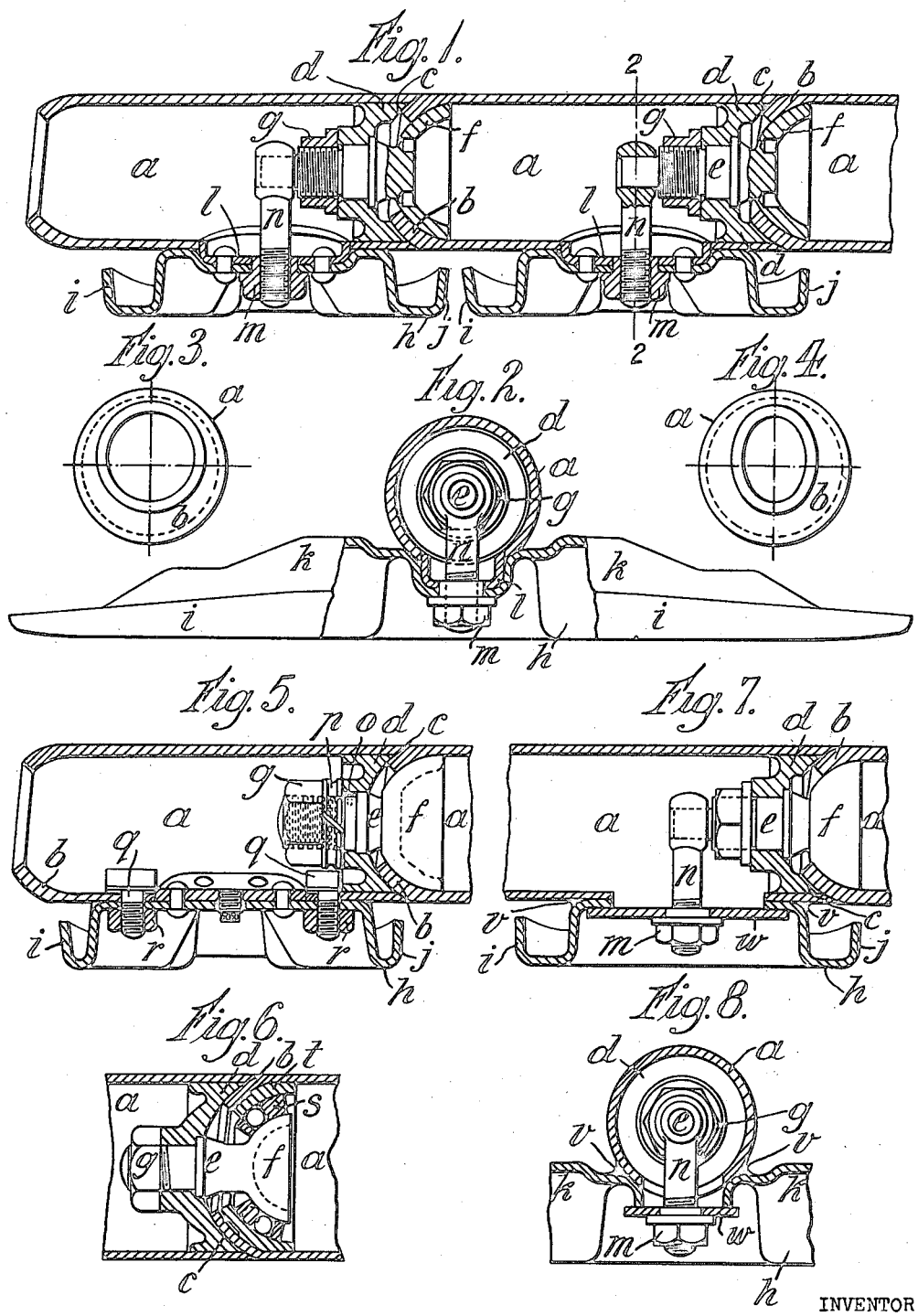

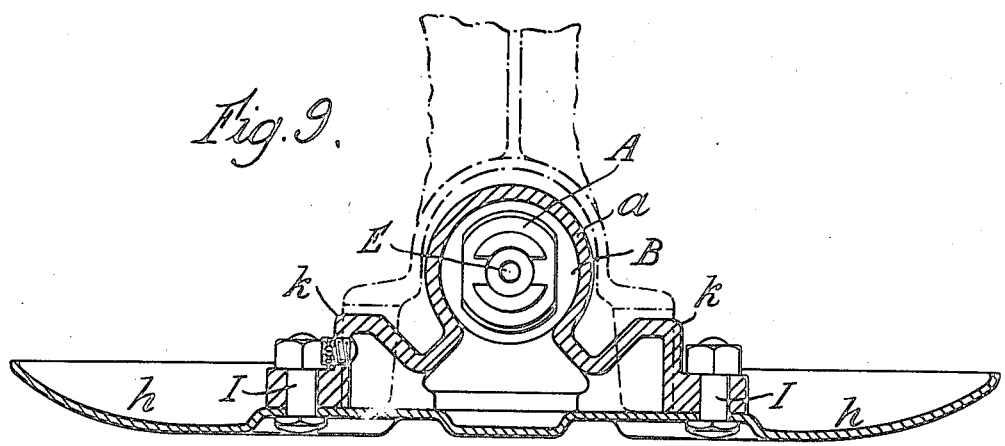
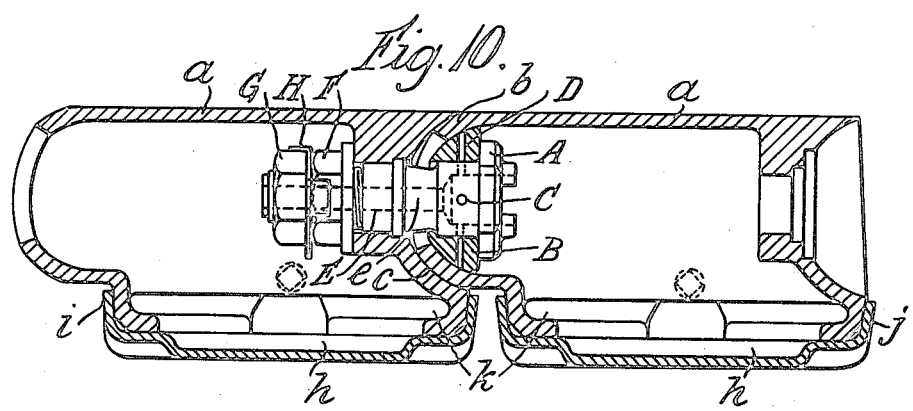
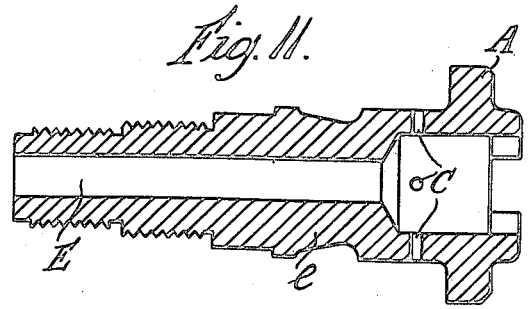
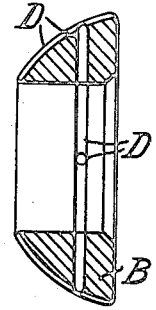

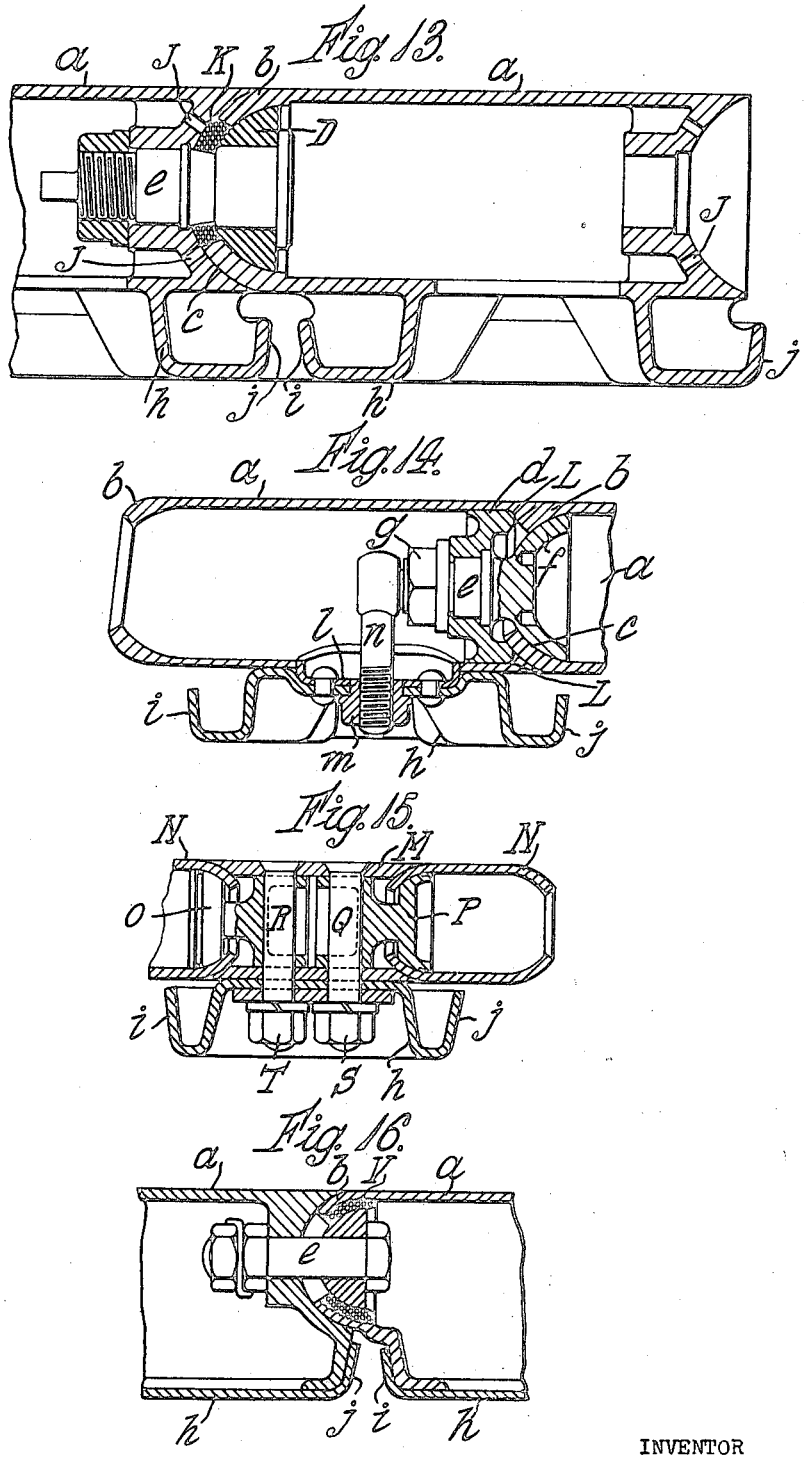

1,440,243

UNITED STATES PATENT OFFICE.

GEORGE JOHN RACKHAM, OF PUTNEY, LONDON, ENGLAND, ASSIGNOR TO ROADLESS TRACTION LIMITED, OF LONDON, ENGLAND.

TRACK FOR ENDLESS-TRACK VEHICLES.

Application filed June 14, 1922. Serial No. 568,223.

*To all whom it may concern:*

Be it known that I, GEORGE JOHN RACKHAM, a subject of the King of Great Britain, residing at 146 upper Richmond Road, Putney, London, England, have invented new and useful Improvements in Tracks for Endless-Track Vehicles, of which the following is a specification.

This invention relates to improvements in tracks for endless track vehicles in which the track shoes are connected to links which are pivotally connected together.

According to this invention the links are tubular and adjacent tubes are connected together by universal joints. Each tube is contracted at one end forming an external spherical surface which engages with an internal spherical surface of similar curvature formed by a plug inserted into the end of or made in one piece with the adjacent tube. Adjacent tubes are connected together by a screw bolt having a spherical head which engages with the internal surface of the contracted end of one tube and by a nut which screws on to the bolt and engages with the plug in the adjacent tube through which the bolt passes. Alternatively the bolt may be made in one piece with the plug and a spherical washer may be secured to it by a nut.

In order to allow of clearance between the tubes, the radius of curvature of the external concave or convex ends is greater than the radius of the tube. The hole in the tube through which the bolt passes is preferably at an angle to the axis of the tube in order to allow the tube to turn a greater distance in an upward direction than in a downward, or alternatively, the hole may be oval.

Each tube carries a shoe which is so formed that the movement downwards of the tubes is limited. Each shoe may be formed of a dished plate having upwardly turned ends and having teeth which engage with the driving sprocket, and a plate, preferably of oval shape, is secured to the dished plate and enters a similarly shaped hole in the tube, the plate being secured to the tube by bolts.

A track constructed according to this invention may be turned sideways so as to permit the vehicle to be steered by laying the track in a curve, and individual track shoes are capable of turning so that the whole shoe can turn when laid on uneven ground, and each link being hollow and entirely enclosed can be filled with lubricant.

The annexed drawings show tracks made in accordance with this invention.

Figure 1 is a longitudinal section and Figure 2 is a transverse section on the line 2—2, Figure 1. Figure 3 is a left hand end view of one of the links and Figure 4 is a modification of the same. Figure 5 is a longitudinal section of another form of track. Figure 6 shows the ends of two links fitted with ball bearings. Figures 7 and 8 are similar views to Figures 1 and 2 and show a modification. Figure 9 is a transverse section and Figure 10 a longitudinal section of a modification of the track shown in Figures 1 and 2. Figures 11 and 12 are sections to a larger scale of the plug and washer shown in Figures 9 and 10. Figure 13 is a longitudinal section of a modified form of track and Figures 14, 15 and 16 show further modifications.

In all the figures $a$ are tubes forming the links and each tube has on its left hand end $b$ an external spherical surface which engages with an internal spherical surface $c$ formed on the right hand end of the adjacent tube by a plug $d$. Adjacent tubes $a$ are connected together by a screw bolt $e$ having a spherical head $f$ which engages with the internal surface of the contracted end $b$ and by a nut $g$ which screws on to the bolt $e$ and engages with the plug $d$. The centre line of the hole in the end $b$ of each tube is not in a line with the axis of the tube in order to allow the tube to turn a greater distance in the upward direction than in the downward. In the modification shown in Figure 4 the hole is made oval.

Each tube $a$ carries a shoe formed of a dished plate $h$ having upwardly turned ends $i$ $j$. The movement downwards of the track is limited by the ends $i$ and $j$ of adjacent shoes coming in contact with one another. On the plate $h$ are teeth $k$ by which the track is driven.

In Figures 1 and 2 another plate $l$ is bolted to the dished plate $h$ and enters a hole in the tube $a$ and the dished plate is secured to the tube by a nut $m$ on an eye-bolt $n$ which is pivotally mounted on the end of the bolt $e$.

In Figure 5 the bolt $e$ is secured to the plug $d$ by a pin $o$ and a split washer $p$ is inserted between the nut $g$ and the end of the plug $d$. The dished plate $h$ is connected to the tube $a$ by two bolts $q$ $q$ and nuts $r$ $r$.

In Figure 6 two rows of balls in a cage $s$ are inserted between the head $f$ of the bolt $e$ and a washer $t$ which bears against it and the internal surface of the end $b$ of the tube $a$.

Figures 7 and 8 show a modification of the track shown in Figures 1 and 2 in which the dished plate $h$ is welded as shown at $v$ $v$ to the tube $a$ and the nut $m$ and eye-bolt $n$ holds a cover plate $w$ over a hole in the tube $a$, which hole serves for the insertion of the nut $g$ and for putting in lubricant.

All the nuts are locked in any suitable manner.

Referring to Figures 9 to 12, the driving teeth $k$ are formed in one piece with the link $a$ and the bolt $e$ has a flange A which engages with a loose spherical washer B preferably made of bronze. The flange A is provided with holes C and the washer B with holes and grooves D for the passage of lubricant. The bolt $e$ has a hole E extending through it so that the lubricant may be forced from one link to another. The bolt $e$ is secured to the link $a$ by right and left hand nuts F and G and a locking plate H. The shoes $h$ are secured to links by bolts I I.

In Figure 13 the link $a$ and the dished plate $h$ forming a shoe are cast in one piece and holes J formed in the end of the link $a$, and the space between the washer D and the end of the link $a$ is filled with felt K.

Figure 14 shows a modification in which the plug $d$ is secured in the link $a$ by spinning the link over the plug as shown at L.

In Figure 15 the track consists of two series of dissimilar tubes M and N secured together by plugs O and P both of which are bolted to the tube M by bolts Q and R and nuts S and T which also secure the dished plate $h$ to the tube M.

In Figure 16 the inner spherical surface of the left hand end $b$ of the link $a$ is lined with white metal as shown at V. In this case the bolt $e$ has no shoulders and the wear of the parts can be easily adjusted by it.

What I claim is:—

1. Endless tracks for vehicles comprising tubular links having their ends in constant contact and universal joint means connecting said links.

2. Endless tracks comprising tubular links having coacting spherical surfaces at their ends, and universal joint means connecting said links.

3. Endless tracks comprising tubular links each having an external spherical surface at one end and an internal spherical surface at the other end, and means for holding the coacting surfaces of adjacent links in constant contact.

4. Endless tracks comprising tubular links each having an external spherical surface at one end and an internal spherical surface at the other end, and universal joint means for holding the coacting surfaces of adjacent links in constant contact.

5. Endless tracks comprising tubular links each having an external spherical surface at one end and an internal spherical surface at the other end and bolts carrying spherical surfaces and holding the external spherical surface of one link in constant contact with the internal spherical surface of the adjacent link.

6. Endless tracks for vehicles comprising tubular links having their ends in constant contact with each other, universal joint means connecting said links, track shoes, and means for connecting the shoes to the links.

7. Endless tracks comprising tubular links having coacting spherical surfaces at their ends, universal joint means connecting said links, track shoes, and means for connecting the shoes to the links.

8. Endless tracks comprising tubular links each having an external spherical surface at one end and an internal spherical surface at the other end, bolts carrying spherical surfaces and connecting the tubular links to hold the external spherical surface of one link in constant contact with the internal spherical surface of the adjacent link, track shoes consisting of a plate with upwardly turned ends, and means for connecting the shoes to the links.

9. Endless tracks comprising tubular links having coacting spherical surfaces at their ends, bolts carrying spherical surfaces and holding said spherical surfaces of the links in constant engagement, track shoes so formed as to limit the downward movement of the links, and means for connecting the shoes to the links.

10. Endless tracks comprising tubular links having coacting spherical surfaces at their ends, bolts carrying spherical surfaces and holding said spherical surfaces of the links in constant engagement, track shoes each consisting of a plate with upturned ends, and driving teeth made unitary with the plate.

11. Endless tracks comprising tubular links each having an external spherical surface at one end, a plug in the other end having an internal spherical surface, and universal joint means holding said external and internal spherical surfaces of adjacent links in constant contact.

12. Endless tracks comprising tubular links each having an external spherical surface at one end and an internal spherical surface at the other end, bolts having spherical surfaces and holding the external and internal spherical surfaces of adjacent links in constant contact, track shoes, screws pivoted to the bolts, and means for securing the shoes to the screws.

13. Endless tracks comprising tubular links each having an external spherical surface at one end and an internal spherical surface at the other end, bolts having spherical surfaces and holding the external and internal spherical surfaces of adjacent links in constant contact, track shoes each so formed as to limit the downward movement of the links, screws pivoted to the bolts, and means for securing the shoes to the screws.

14. Endless tracks for vehicles comprising tubular links and means holding the ends of adjacent links in constant contact so that the links provide a continuous smooth surface for rollers at all times.

15. Endless tracks for vehicles comprising tubular links, and universal joint means holding the ends of adjacent links in constant contact so that the links provide a continuous smooth surface for rollers at all times.

16. Endless tracks for vehicles comprising tubular links having coacting spherical surfaces at their ends, and universal joint means holding the ends of adjacent links in constant contact so that the links provide a continuous smooth surface for rollers at all times.

17. Endless tracks for vehicles comprising hollow tubular links adapted to contain lubricant, and having spherical ends, and means holding the spherical ends in contact to permit relative movement but prevent escape of the lubricant.

18. Endless tracks for vehicles comprising hollow tubular links adapted to contain lubricant, each link having an external spherical end and an internal spherical end, and a bolt holding the coacting spherical ends of adjacent links together to permit universal movement but prevent escape of lubricant.

19. Endless tracks for vehicles comprising hollow tubular links, a bolt for connecting adjacent links, said link having an opening through which the bolt may be passed into place, a plate for covering said opening, and means for holding the plate in position.

20. Endless tracks for vehicles comprising hollow tubular links, a bolt for connecting adjacent links, said link having an opening through which the bolt may be passed into place, a plate for covering said opening, a track shoe carried by said plate, and means for holding the plate in position.

21. Endless tracks for vehicles comprising hollow tubular links, a bolt for connecting adjacent links, said link having an opening through which the bolt may be passed into place, a plate for covering said opening, a track shoe carried by said plate, and means supported from the bolt for holding the plate in position.

22. Endless tracks for vehicles comprising hollow tubular links provided with coacting spherical surfaces, a bolt having a spherical surface for connecting adjacent links and holding their spherical surfaces in constant contact, said link having an opening through which the bolt may be passed into place, a plate for covering said opening and means for holding the plate in position.

23. Endless tracks for vehicles comprising hollow tubular links adapted to contain lubricant, said links having coacting spherical ends, a bolt holding said spherical ends in contact and preventing escape of lubricant, each link having an opening through which the bolt may be passed into place, a plate for covering said opening and preventing escape of lubricant, and means for holding said plate in position.

In testimony that I claim the foregoing as my invention I have signed my name this 12th day of June, 1922.

GEORGE JOHN RACKHAM.